Figure 1:
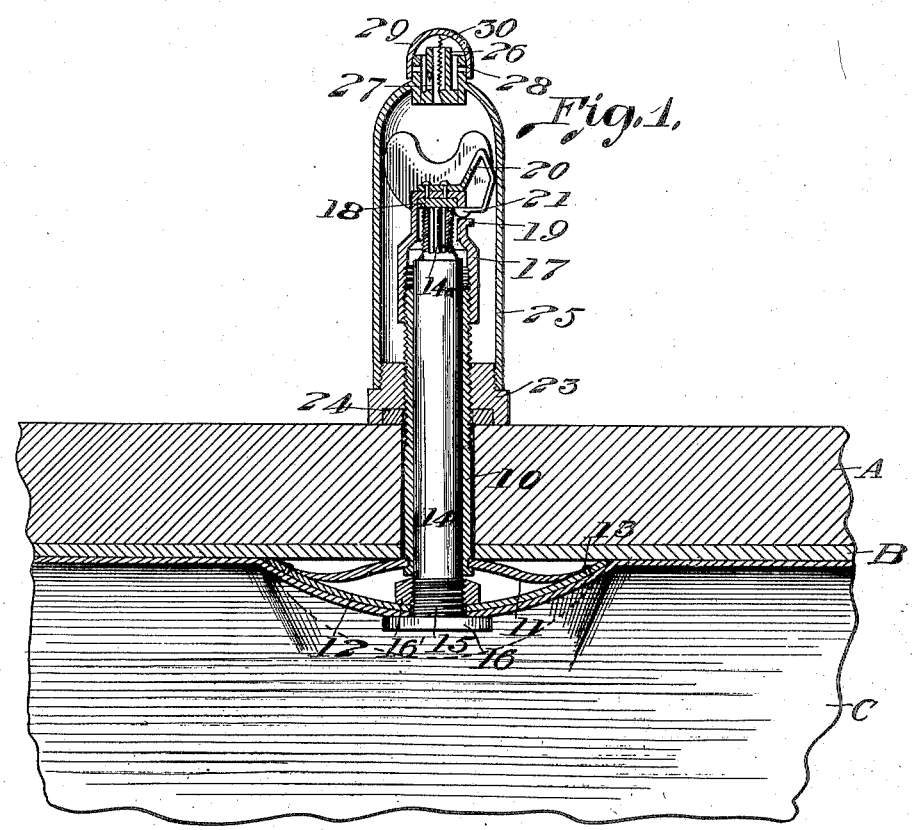

F. H. VALITON.
TIRE ALARM.
APPLICATION FILED MAY 22, 1919.

1,325,918.

Patented Dec. 23, 1919.

INVENTOR
F. H. VALITON,
BY
ATTORNEYS

UNITED STATES PATENT OFFICE.

FRED HENRY VALITON, OF DEER LODGE, MONTANA.

TIRE-ALARM.

1,325,918.             Specification of Letters Patent.      Patented Dec. 23, 1919.

Application filed May 22, 1919. Serial No. 298,861.

*To all whom it may concern:*

Be it known that I, FRED HENRY VALITON, a citizen of the United States, and a resident of Deer Lodge, in the county of Powell and State of Montana, have invented certain new and useful Improvements in Tire-Alarms, of which the following is a specification.

This invention relates to pneumatic tires and particularly to means for giving an audible signal when a leak occurs.

The general object of this invention is to provide a device of this character which is very simple in construction and effective in operation, having few parts, and those of such form that they may be readily assembled.

A further object is to provide a device of this character which may be attached to and coact with the regular valve stem commonly employed to inflate the tire.

A further object is to provide a signal valve which is automatically opened upon a decrease in pressure within the tire to thereby cause release of air into a casing having therein suitable ports causing a whistle to be sounded by the out-rushing air.

Other objects will appear in the course of the following description.

Figure 2:
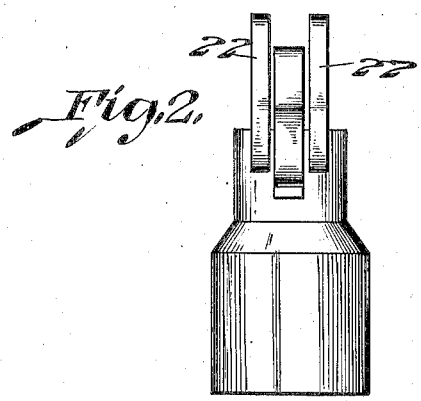

In the drawings:

Figure 1 is a fragmentary sectional view of an inner tube, rim and felly with my signal applied thereto; and Fig. 2 is a side elevation of the cap and signal valve.

In these drawings A designates the felly, B the rim of a wheel, and C an inner tube of a pneumatic tire. Extending through the felly is a sleeve 10, exteriorly threaded for a portion of its length and overturned at its inner end upon a leaf-spring 11, which is slightly bowed. A spreader 12 is riveted at 13 to the ends of the spring.

Extending through the smooth bore of the sleeve 10 is a tubular valve body 14, which may be threaded for its entire length, but is shown as threaded at its inner end at 15 and as having a head 16. This body passes through the inner tube and the spreader 12, and a nut 16' compresses the spreader against the tube. At its outer end the body 14 is reduced and may be threaded. The body is provided with an interior longitudinally movable stem 14ª.

Engaging the threaded sleeve is a cap 17, reduced at its upper end and carrying a gasket 18 to fit against and close the upper end of the body 14. At one point the neck of the cap is slotted and formed with a lip 19, and riveted to the end of the cap is the resilient shank 20 of a head 21. This shank extends outward from the cap, then inward or toward the felly, and then laterally inward to the head 21. The head 21 has a rounded lower surface bearing against the lip 19, and fits in the slot in the cap. The tendency of the shank 20 is to spring inward. It is held from lateral movement by the webs or wings 22, disposed on each side of the shank 20, which provide a finger hold whereby the cap 17 may be turned and prevent any deformation of the shank 20.

Threaded on the sleeve 10 is a nut 23, which carries a gasket 24 bearing against the rim and which is exteriorly screw-threaded to engage a dust cap or casing 25 which is formed at its upper end to provide a central hollow stem 26, having an aperture in its side wall and an outer annular wall having apertures 28, normally closed by a slidable cap 29 urged down over the outer wall by a spring 30.

In the use of this invention, when the tube C is inflated fully, the leaf spring 11 is compressed until the spreader is forced against the rim B. The valve cap 17 is now screwed down until the gasket 18 presses down firmly on the valve body 14 thus preventing leakage should the valve be defective. The dust cap is now screwed in place. Should a leak occur in the tire causing the pressure therein to decrease beyond a specified amount, the leaf spring 11 will force the valve stem inward. When the stem has passed the head 21, the spring shank 20 will force the head 21 inward, and the rounded face engaging the stem 14ª will open the usual valve in the valve body thus permitting air to escape into the dust cap. This air being under pressure will force up the sliding cap 29 disclosing the openings 28, and the air issuing through these openings will cause a whistling noise, acting as an audible signal, that the tire is leaking. The cap 30 being rounded acts as a sound amplifier or sound bell for the whistle and also, of course, prevents dust from entering and clogging holes 28.

It is to be understood that this device is to be used as an ordinary tire inflating valve, the tire being inflated by removing the dust cap 25 and the cap 17, and attaching the usual pumping hose to the reduced end of the valve body 14.

My alarm may be attached to the regular valve body by means of a nut 16', or a valve body may be employed as shown in the drawings, which is not threaded its entire length.

It is to be noted that the shank 20 is of such shape that when the dust cap 25 is forced down over it, it compresses the spring shank 20 and puts a tension on its free end.

While I have illustrated an embodiment of my invention which is thoroughly effective, yet it is obvious that many minor changes might be made without departing from the spirit of the invention as embodied in the appended claims.

I claim:

1. The combination with a sleeve for connection with the felly of an automobile wheel or the like, of a valve body slidable within the sleeve and connected with the inner tube of the tire and having an interior valve stem, means to automatically move the valve body longitudinally in one direction when the pressure within the inner tube falls below a predetermined point, a cap connected with the free end of the sleeve and having means to engage with the outlet end of the valve body to close the same, said cap having a lateral opening formed therein, a resilient member carried by the cap and having a laterally extending portion projecting through said opening, said laterally extending portion carrying a depending head adapted to engage with the valve stem and depress it, said resilient member being tensioned to move inwardly automatically when released, and a signal device receiving air from the valve body.

2. The combination with a sleeve for connection with the felly of an automobile wheel or the like, of a valve body slidable within the sleeve and connected with the inner tube of the tire and having an interior valve stem, a spring to move the valve body longitudinally in one direction when pressure within the inner tube falls below a predetermined point, a cap connected with the free end of the sleeve and having an interior washer to engage with the outlet end of the valve body to close the same, said cap having a lateral opening formed therein, a curved resilient member secured to the cap and having its free end extending laterally into said opening, said free end being provided with a depending head adapted to engage with and depress the valve stem, said resilient member being tensioned so that its free end moves inwardly when released, a dust cap secured to the sleeve and receiving air from the valve body, and a signal device carried by the dust cap.

3. The combination of the inner tube of a pneumatic tire and a felly, of a sleeve extending through the felly and into the tube, a tubular valve body extending through and slidingly disposed in the sleeve, and having a valve stem, a spreader carried at the inner end of the body, the inner tube being held engaged with the body by the spreader, a spring carried by the sleeve and bearing against the spreader to urge it inward, a nut engaging the sleeve with the felly, a cap detachably engaging the sleeve and extending over the body and normally closing the outer end thereof, said cap having a slot in its side wall, an inwardly urged head in the slot, adapted when the body moves inward relatively to the cap to shift over the valve stem and depress it, and permit the passage of air through the body, and a dust cap into which the air is discharged and having a whistle sounded by the discharging air.

4. The combination of the inner tube of a pneumatic tire, and a felly of a sleeve extending through the felly and into the tube, a tubular valve body extending through and slidingly disposed in the sleeve, and having a valve stem, a spreader carried at the inner end of the body, the inner tube being held engaged with the body of the spreader, a spring carried by the sleeve and bearing against the spreader to urge it inward, a nut engaging the sleeve with the felly, a cap detachably engaging the sleeve and extending over the body and normally closing the outer end thereof, said cap having a slot in its side wall, a resilient shank mounted upon the top of the cap extending outward and toward the felly and then inward and having a head disposed in the slot and having a convex under face, and a dust cap having detachable engagement with the nut and when in place putting the spring shank under tension to urge the head inward against the outer end of the tubular body, whereby the head will engage and shift the stem when the body moves inward to thereby limit the passage of air into the dust cap, said cap having a discharge opening formed to sound a whistle upon the passage of air therethrough.

5. The combination of the inner tube of a pneumatic tire, and a felly of a sleeve extending through the felly and into the tube, a tubular valve body extending through and slidingly disposed in the sleeve, and having a valve stem, a spreader carried at the inner end of the body, the inner tube being held engaged with the body by the spreader, a spring carried by the sleeve and bearing against the spreader to urge it inward, a nut engaging the sleeve with the felly, a cap detachably engaging the sleeve and extending over the body and normally closing the outer end thereof, said cap having a slot in its side wall, a resilient shank mounted upon the top of the cap extending outward and toward the felly and then inward and having a head disposed in the slot and having a convex under face, and a dust cap having detachable engagement with the nut and when in place putting the spring shank under tension to urge the head inward against the outer end of the tubular body, whereby the head will engage and shift the stem when the body moves inward to thereby limit the passage of air into the dust cap, said cap having a discharge opening formed to sound a whistle upon the passage of air therethrough, the first-named cap having a pair of wings disposed on opposite sides of the shank, and guarding the same and forming a handle for the cap.

FRED HENRY VALITON.